3,506,765
METHOD FOR THE RELIEF OF COUGH WITH A THEBAINE DERIVATIVE
Isao Seki, Hiromu Takagi, Shinsaku Kobayashi, Issei Iwai, and Haruhiko Minakami, Tokyo, Japan, assignors to Sankyo Company Limited, Tokyo, Japan
No Drawing. Filed Feb. 26, 1968, Ser. No. 707,952
Int. Cl. A61k 27/00
U.S. Cl. 424—260   9 Claims

ABSTRACT OF THE DISCLOSURE

New use of 14-hydroxy-dihydro-6β-thebainol 4-methyl ether as an antitussive. Such thebainol exerts a higher antitussive activity on coughs due to a wide variety of respiratory diseases in a human subject and far less side effects, as compared with prior antitussive drugs, especially codeine phosphate, in an amount, calculated on a daily dosage basis, ranging from 3 to 12 mg., preferably 6 mg., usually three times a day at a single dose of 1–4 mg., preferably 2 mg., usually in the form of pharmaceutical composition such as tablets, solutions for injection and the like.

---

This invention relates to a new use of thebaine derivative as a medicine. More particularly, this invention relates to a new use of 14-hydroxy-dihydro-6β-thebainol 4-methyl ether as an antitussive.

A considerable number of chemical substances have been used as an antitussive for the relief of various types and severities of coughs which are frequently and voluntarily produced in various respiratory diseases including pulmonary tuberculosis, acute or chronic bronchitis, pneumonia, bronchial asthma, gangrene of the lung, cancer of the lung etc. Unfortunately, most of these substances have not achieved full success in the relief of cough, since some of them exhibited a high antitussive activity only in extremely limited clinical applications; even if they showed a good antitussive activity in general clinical applications, they were of short duration or exhibited undesired side effects; their physiological compatibilities were not so good as they could be liberally employed for the treatment of coughs due to a wide variety of respiratory diseases; their effective doses could approach near the order of their toxic doses; and so on.

As a typical one, codeine, one of opium alkaloids, is widely employed, usually in the form of the phosphate thereof, as an antitussive for the relief of cough. However, as being common to narcotic drugs, such an alkaloid shows some undesired side effects; for example, central excitation and depression, constipation, nausea and emesis, blood pressure depression, tolerance and addiction etc. and, thus, careful consideration is required in order to gain a safe and satisfactory antitussive effect.

Accordingly, there is the need for a new class of antitussive which will exert a higher antitussive activity and less undesired side effects.

Now, it has been, unexpectedly, found that the 14-hydroxy-dihydro-6β-thebainol 4-methyl ether exhibits in a human subject at a daily dosage of 3–12 mg. a higher antitussive activity against cough due to a wide variety of respiratory diseases, as compared with prior antitussive drugs, and also—it will be more significant—that said thebainol has little or far less side effects in clinical applications, particularly no vomiting action as well as much weaker additive, constipating and respiratory and blood pressure depressant actions, as compared with well-known antitussive drugs, for example, codeine phosphate.

It is, therefore, a principal object of this invention to provide a novel process for the relief of cough which comprises administering to a human subject suffering from cough a specific antitussive amount of 14-hydroxy-dihydro-6β-thebainol 4-methyl ether.

It is also contemplated within this invention to provide a medicament for the relief of cough which contains as an active ingredient antitussive amount of the aforesaid thebainol.

Other objects and advantages of this invention will be apparent to those skilled in the art from the detailed description which follows.

The 14-hydroxy-dihydro-6β-thebainol 4-methyl ether which may be effectively employed in this invention is a known substance represented by the formula

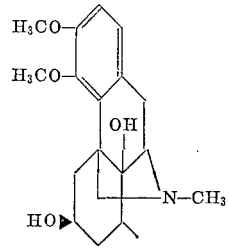

and it may be readily obtained by several known procedures, for example, by reacting 14-hydroxy-dihydro-thebainone 4-methyl ether with metallic sodium and a secondary alcohol (Japanses Patent No. 445,922).

The process of this invention for the treatment of a human subject suffering from cough may be conveniently carried out by oral administration, but parenteral administration may also be employed, particularly for emergency treatment.

The antitussive amount to be administered for the relief of cough, that is, the dosage of the active compound in the process of this invention should be determined taking careful consideration of the ages and weights of the patient, frequencies and severities of coughing, possible side effects on a human body and other factors to be studied on determining the dosage of narcotic drugs. In the process of this invention, the average total daily dosage for adults of said thebainol may be advantageously within the range of 3–12 mg., preferably 6 mg., while larger daily dosages may be employed only for emergency treatment. The above-specified daily dosage of said thebainol may be preferably given in multiple divided doses, suitably three times a day at a single dose of 1–4 mg., preferably 2 mg. The dosage for infants and children generally depends on ages and weights of the patient, and is generally smaller than that of adult as defined hereinabove.

The active thebainol may be administered alone or in the form of pharmaceutical compositions but it is preferred to administer said thebainol in the form of pharmaceutical compositions.

In this invention, the antitussive pharmaceutical composition comprising 14-hydroxy-dihydro-6β-thebainol 4-methyl ether as active ingredient and a compatible pharmaceutical carrier can be provided. The compositions can be in the form of parenteral composition including solutions suitable for injection, or the compositions can be in the form of oral compositions including tablets, capsules, powders or oral suspensions and syrups. The compatible pharmaceutical carrier can be either solid or liquid material. The carrier should be essentially non-toxic.

The composition of this invention can be in the form of parenteral composition, preferably, in the form of solutions suitable for injection which comprises 14-hydroxy-dihydro-6β-thebainol 4-methyl ether as active ingredient in a suitable, compatible and non-toxic solvent.

The preparation of a sterile solution suitable for injection can be accomplished by any conventional method, for example, by admixing the active ingredient with water or isotonic saline and sterilizing the resulting solution, for example, by filtration or by heating. The concentration of said thebainol in such a solution may be usually varied within the range of about 5–40 w./v. percent, i.e. about 0.5–4 mg. of the thebainol per ml. of a finished solution. In those solutions suitable for injection, there may be such adjuvants as a preservative or an antibacterial agent.

As another form of the pharmaceutical composition in this invention, the active ingredient can be used in the form of a tablet. The tablet is comprised of usually the active ingredient and the carrier which includes a suitable pharmaceutical vehicle, binder or filler, such as starch, gelatin, lactose, talc, cellulosic material, stearic acid, magnesium stearate and the like. Any of the other tableting materials generally used in pharmaceutical practice may be employed, unless they are incompatible with the active ingredient. In one of the preferable procedures for making a tablet in this invention, the prescribed ingredients are compressed by a conventional means into tablets, each usually containing the active ingredient at about 0.5 to 4 mg. dosages. The tablets can be coated, if desired, with any of the conventional tablet coating materials.

In another pharmaceutical composition in this invention, the active ingredient can be filled into an ordinary hard or soft gelatin capsule. The capsule may also contain a solid or non-solid, compatible, non-toxic material. The preferred capsule ingredients include solid filler, such as starch, lactose, talc, stearic acid, magnesium stearate and the like. Generally, in each capsule, the active ingredient is added in an amount of from 0.5 to 4 mg.

In another pharmaceutical composition in this invention, the active ingredient can be in the form of powder, syrup or suspension. Usually, from about 0.1 to 0.5% by weight of the active ingredient may be included in this composition. The preparation of these forms of the pharmaceutical composition may be accomplished by any of the conventional methods. In particular, it is preferred in the form of powder that the powder containing the active ingredient in the given concentration is previously prepared in a large amount and such powder may be administered in the desired amount, or the powder containing the active ingredient in higher concentration are previously prepared and, before usage, such powder may be diluted with a suitable pharmaceutical carrier to make the prescribed powder.

The pharmaceutical carrier used for the preparation of syrup or suspension may be any of those employed by the conventional pharmaceutical practice.

Coloring agents, aromatics and other adjuvants may be further admixed with the present composition, if desired.

As stated above, the said 14-hydroxy-dihydro-6β-thebainol 4-methyl ether exhibits a higher antitussive activity and less side effects, as compared with prior antitussive agents, for example, codeine phosphate.

Such beneficial pharmacological properties of said thebainol will be discussed hereinbelow in greater detail, with reference to those data available from a series of laboratory experiments and clinical trials.

I. LABORATORY EXPERIMENTS (1) Antitussive activity measured by a mechanically stimulating method with guinea pig's trachea Method: Following the method reported by K. Takagi et al. in Yakugaku Zasshi [Journal of the Pharmaceutical Society of Japan, 78, 553 (1958)], the experiment was carried out by employing male guinea pigs with body weights of 250–400 g. at 15, 30 and 60 minutes after subcutaneous administration of the test compounds (14-hydroxy-dihydro-6β-thebainol 4-methyl ether and codeine phosphate), mechanical stimuli were given, and when no cough occurred to two or more stimuli, the test compound was regarded as effective. Then, $ED_{50}$ was calculated by the up-and-down method.

Results:

$ED_{50}$, mg./kg.
14-hydroxy-dihydro-6β-thebainol 4-methyl ether __ 0.44
Codeine phosphate _____ 11.00

It will be seen from the above results that 14-hydroxy-dihydro-6β-thebainol 4-methyl ether exhibits 25 times as high in an antitussive activity as codeine phosphate.

(2) Acute toxicity in mice

Method: Following a conventional procedure commonly employed in the art, the experiment was carried out by employing several groups of male mice with body weights of 17–22 g. and intravenously, orally or subcutaneously administering the test compounds (14-hydroxy-dihydro-6β-thebainol 4-methyl ether and codeine phosphate) to the host animals. Then, $LD_{50}$ was calculated by the Litchfield-Wilcoxon method.

Results: The results are given hereinbelow.

| | Route $LD_{50}$ (mg./kg.) | | |
| --- | --- | --- | --- |
| | Intravenous | Subcutaneous | Oral |
| 14-hydroxy-dihydro-6β-thebainol 4-methyl ether | 91.2 (87–95)+ | 1,150 (790–1,600)+ | 1,300 (940–1,780)+ |
| Codeine phosphate | 87.0 (75–101)+ | 275 (270–282)+ | 550 (450–670)+ |

+The values in each parenthesis mean the 95% confidence limit.

It will be seen from the above results that, in the case of intravenous administration, 14-hydroxy-dihydro-6β-thebainol 4-methyl ether exhibits the almost same order of acute toxicity as codeine phosphate, while, in the case of oral and subcutaneous administration, the former exhibits about ½–¼ time as low acute toxicity as the latter.

II. CLINICAL TRIALS

Trial A (1) Patient: 42 (silicosis or pulmonary tuberculosis).

(2) Dose levels, Procedures and Results: A double-blind cross-over design with randomized sequence of treatments was adopted using a certain number of placebo and tablets containing as an active ingredient 14-hydroxy-dihydro-6β-thebainol 4-methyl ether. Daily dosage of the active ingredient was 6 mg. per day with 3 divided dose unit forms. The patients were administered with the placebo for 5 days and, consecutively, with the tablet for further 5 days. Such dosing schedule was repeated for 29–80 days.

During the period of trial, the frequency of coughing was observed seven times (i.e. before and after administration, and after going to bed) every day and scored as point 0, 1, 2 or 3 according to a scale consisting of 4 grades, which have been previously defined by those skilled in the art, based upon the frequencies of coughing.

After expiration of the trial period, the summing up and statistical analysis of scored results show that the antitussive activity of 14-hydroxy-dihydro-6β-thebainol 4-methyl ether differs to a statistically significant degree at 0.05 level from that of the placebo.

Trial B

Preparation:
(1) Solution for injection: 2 mg. of 14-hydroxy-dihydro-6β-thebainol 4-methyl ether in each ampoule (1 ml.).
(2) Capsule: 1 mg. of 14-hydroxy-dihydro-6β-thebainol 4-methyl ether in each capsule (300 mg.).

Results:
(1) Solution for injection: The antitussive activity of 14-hydroxy-dihydro-6β-thebainol 4-methyl ether was evaluated on 28 patients suffering from a wide variety of respiratory diseases with various types and severities of coughing. The antitussive effect on pulmonary tuberculosis is shown in the following Table I, and that on other respiratory diseases in the following Table II.

TABLE I.—ANTITUSSIVE EFFECT ON PULMONARY TUBERCULOSIS (WITH SOLUTION FOR INJECTION)

| Case: | Name | Sex, Age | Disease | Type of cough | Dose, mg. | Antitussive effect | Side effect |
|---|---|---|---|---|---|---|---|
| 1 | SA | ♀, 26 | Pulmonary tuberculosis | Wet | 2 | (++) after 15 minutes | (−) |
| 2 | HO | ♂, 56 | do | Wet | 2 | (++) after 20 minutes | (+) Vertigo |
| 3 | NA | ♂, 58 | do | Wet | 2 | (++) after 15 minutes | (−) |
| 4 | HO | ♂, 56 | do | Wet | 2 | (++) after 10 minutes | Slight feeling of tension |
| 5 | SA | ♂, 29 | do | Dry | 2 | do | (−) |
| 6 | HO | ♂, 56 | do | Wet | 2 | (++) after 30 minutes | Feeling of tension |
| 7 | NA | ♂, 58 | do | Wet | 2 | do | (−) |
| 8 | YA | ♂, 58 | do | Wet | 2 | (++) after 15 minutes | (−) |
| 9 | YA | ♂, 58 | do | Wet | 2 | (++) after 30 minutes | (−) |
| 10 | YA | ♂, 58 | do | Wet | 2 | (++) after 20 minutes | (−) |
| 11 | NA | ♂, 58 | do | Wet | 2 | (++) after 30 minutes | (−) |
| 12 | YA | ♂, 58 | do | Wet | 2 | (++) after 20 minutes | (−) |
| 13 | MI | ♂, 62 | do | Wet | 2 | (++) after 30 minutes | (−) |
| 14 | YA | ♂, 58 | do | Wet | 2 | (++) after 20 minutes | (−) |
| 15 | YA | ♂, 58 | do | Wet | 2 | do | (−) |
| 16 | NA | ♂, 58 | do | Wet | 2 | (++) after 15 minutes | (−) |
| 17 | NA | ♂, 58 | do | Wet | 2 | (++) after 20 minutes | (−) |
| 18 | NA | ♂, 58 | do | Wet | 2 | (++) after 15 minutes | (−) |
| 19 | NA | ♂, 58 | do | Wet | 2 | (++) after 20 minutes | (−) |
| 20 | YA | ♂, 58 | do | Wet | 2 | do | (−) |
| 21 | YA | ♂, 58 | do | Wet | 2 | (++) after 15 minutes | (−) |
| 22 | YA | ♂, 58 | do | Wet | 2 | do | (−) |
| 23 | NA | ♂, 58 | do | Wet | 2 | do | (−) |
| 24 | NA | ♂, 58 | do | Wet | 2 | do | (−) |
| 25 | YA | ♂, 58 | do | Wet | 2 | (++) after 20 minutes | (−) |
| 26 | YA | ♂, 58 | do | Wet | 2 | do | (−) |
| 27 | YA | ♂, 58 | do | Wet | 2 | (++) after 15 minutes | (−) |
| 28 | YA | ♂, 58 | do | Wet | 2 | (++) after 20 minutes | (−) |
| 29 | YA | ♂, 58 | do | Wet | 2 | do | (−) |
| 30 | YA | ♀, 34 | do | Wet | 2 | do | (−) |
| 31 | HA | ♀, 34 | do | Wet | 2 | (++) after 15 minutes | (−) |
| 32 | KI | ♂, 62 | do | Wet | 2 | (++) after 20 minutes | (−) |
| 33 | HA | ♀, 34 | do | Wet | 2 | (++) after 15 minutes | (−) |
| 34 | HA | ♀, 34 | do | Wet | 2 | do | (−) |
| 35 | YA | ♂, 58 | do | Wet | 2 | (++) after 20 minutes | (−) |
| 36 | YA | ♂, 58 | do | Wet | 2 | do | (−) |
| 37 | YA | ♂, 58 | do | Wet | 2 | (++) after 15 minutes | (−) |
| 38 | YA | ♂, 58 | do | Wet | 2 | (++) after 20 minutes | (−) |
| 39 | YA | ♂, 64 | do | Wet | 2 | do | (−) |
| 40 | YA | ♂, 64 | do | Wet | 2 | do | (−) |
| 41 | YA | ♂, 64 | do | Wet | 2 | do | (−) |
| 42 | YA | ♂, 64 | do | Wet | 2 | (++) after 15 minutes | (−) |
| 43 | SU | ♂, 43 | do | Wet | 2 | (++) after 20 minutes | (−) |
| 44 | SU | ♂, 43 | do | Wet | 2 | do | (−) |
| 45 | SU | ♂, 43 | do | Wet | 2 | (++) after 15 minutes | (−) |
| 46 | SU | ♂, 43 | do | Wet | 2 | do | (−) |
| 47 | SU | ♂, 43 | do | Wet | 2 | do | (−) |

See footnote bottom of Table II.

TABLE II.—ANTITUSSIVE EFFECT ON OTHER RESPIRATORY DISEASES (WITH SOLUTION FOR INJECTION)

| Case | Name | Sex, Age | Disease | Type of cough | Dose, mg. | Antitussive effect | Side effect |
|---|---|---|---|---|---|---|---|
| 1 | AA | ♀, 22 | Acute bronchitis | Dry | 2 | (++) after 20 minutes | Vertigo after injection |
| 2 | MA | ♀, 30 | do | Dry | 2 | (++) after 15 minutes | (−) |
| 3 | AA | ♀, 22 | do | Dry | 2 | (++) after 10 minutes | Vertigo with cold sweat |
| 4 | MU | ♂, 24 | do | Dry | 2 | (++) after 15 minutes | (−) |
| 5 | KO | ♀, 17 | do | Dry | 2 | do | (−) |
| 6 | II | ♀, 34 | do | Dry | 2 | (++) after 10 minutes | (−) |
| 7 | KA | ♂, 45 | do | Dry | 2 | (++) after 20 minutes | (−) |
| 8 | EE | ♂, 76 | Chronic bronchitis | Wet | 2 | (++) after 10 minutes | (−) |
| 9 | OO | ♂, 56 | Gangrene of the lung | Wet | 2 | (+) after 30 minutes | (−) |
| 10 | DA | ♂, 36 | do | Wet | 2 | (++) after 15 minutes | (−) |
| 11 | DA | ♂, 36 | do | Wet | 2 | do | (−) |
| 12 | DA | ♂, 36 | do | Wet | 2 | do | (−) |
| 13 | DA | ♂, 36 | do | Wet | 2 | (++) after 20 minutes | (−) |
| 14 | DA | ♂, 36 | do | Wet | 2 | do | (−) |
| 15 | DA | ♂, 36 | do | Wet | 2 | do | (−) |
| 16 | DA | ♂, 36 | do | Wet | 2 | (+) after 20 minutes | (−) |
| 17 | DA | ♂, 36 | do | Wet | 2 | (++) after 15 minutes | (−) |
| 18 | DA | ♂, 36 | do | Wet | 2 | do | (−) |
| 19 | II | ♀, 62 | Cancer of the lung | Dry | 2 | do | (−) |
| 20 | II | ♀, 62 | do | Dry | 2 | (++) after 20 minutes | (−) |
| 21 | SA | ♀, 62 | do | Wet | 2 | (++) after 30 minutes | (−) |
| 22 | SA | ♀, 62 | do | Wet | 2 | do | (−) |
| 23 | SA | ♀, 62 | do | Wet | 2 | (+) after 30 minutes | (−) |
| 24 | SA | ♀, 62 | do | Wet | 2 | (−) | (−) |
| 25 | SA | ♀, 62 | do | Wet | 2 | (++) after 30 minutes | (−) |
| 26 | II | ♀, 62 | do | Dry | 2 | (++) after 15 minutes | (−) |
| 27 | II | ♀, 62 | do | Dry | 2 | (++) after 20 minutes | (−) |
| 28 | HV | ♀, 62 | do | Dry | 2 | do | (−) |
| 29 | HV | ♀, 62 | do | Wet | 2 | (−) | (−) |

TABLE II.—Continued

| Case | Name | Sex, Age | Disease | Type of cough | Dose, mg. | Antitussive effect | Side effect |
|---|---|---|---|---|---|---|---|
| 30 | TA | ♀, 62 | ___do___ | Dry | 2 | (++) after 15 minutes | (−) |
| 31 | YA | ♀, 62 | ___do___ | Wet | 2 | ___do___ | (−) |
| 32 | YA | ♀, 62 | ___do___ | Wet | 2 | (++) after 20 minutes | (−) |
| 33 | YA | ♂, 61 | ___do___ | Wet | 1 | (+) after 30 minutes | (−) |
| 34 | YA | ♂, 61 | ___do___ | Wet | 1 | (++) after 20 minutes | (−) |
| 35 | YA | ♂, 61 | ___do___ | Wet | 1 | ___do___ | (−) |
| 36 | HI | ♂, 59 | ___do___ | Wet | 1 | (++) after 15 minutes | (−) |
| 37 | HI | ♂, 59 | ___do___ | Wet | 1 | ___do___ | (−) |
| 38 | HI | ♂, 59 | ___do___ | Wet | 1 | (+) after 20 minutes | (−) |
| 39 | HI | ♂, 59 | ___do___ | Wet | 2 | (++) after 10 minutes | (−) |
| 40 | HI | ♂, 59 | ___do___ | Wet | 2 | (++) after 15 minutes | (−) |
| 41 | RA | ♂, 68 | Spontaneous pneumothorax | Dry | 2 | (++) after 20 minutes | (−) |
| 42 | KI | ♂, 25 | ___do___ | Dry | 2 | (++) after 15 minutes | (−) |
| 43 | IC | ♀, 54 | Bronchial asthma | Dry | 2 | (++) after 20 minutes | (−) |
| 44 | IC | ♀, 54 | ___do___ | Dry | 2 | (+) after 15 minutes | (−) |
| 45 | IC | ♀, 54 | ___do___ | Dry | 2 | ___do___ | (−) |

NOTE.—In the Tables I and II, the symbols (++) and (+) in the "Antitussive effect" column mean clinically "excellent" and "good" antitussive effects, respectively; the symbol (−) in the "Side effect" column being "not observed."

(2) Capsule.—The antitussive activity of 14-hydroxy-dihydro-6β-thebainol 4-methyl ether was evaluated on 58 patients suffering from a wide variety of respiratory diseases with various types and severities of coughing. The antitussive effect on pulmonary tuberculosis is shown in the following Table III, and that on other respiratory diseases in the following Table IV.

TABLE III.—ANTITUSSIVE EFFECT ON PULMONARY TUBERCULOSIS (WITH ORAL ADMINISTRATION OF CAPSULES)

| Case | Name | Sex, age | Disease | Type of cough | Dose, mg. | Frequency of administering | Duration (Days or Times) | Antitussive effect |
|---|---|---|---|---|---|---|---|---|
| 1 | MI | ♂, 67 | Pulmonary tuberculosis | Wet | 2 | 3 | 30 days | (++) |
| 2 | NA | ♂, 58 | ___do___ | Wet | 2 | At once | 20 days | (++) |
| 3 | OC | ♂, 67 | ___do___ | Wet | 2 | 3 | 10 days | (++) |
| 4 | SO | ♀, 38 | ___do___ | Wet | 2 | At once | 7 days | (++) |
| 5 | KA | ♂, 58 | ___do___ | Wet | 2 | 2 | 5 days | (++) |
| 6 | SH | ♂, 67 | ___do___ | Wet | 2 | At once | 7 days | (++) |
| 7 | TE | ♂, 55 | ___do___ | Dry | 2 | 3 | 5 days | (++) |
| 8 | AO | ♀, 46 | ___do___ | Wet | 2 | At once | 20 days | (++) |
| 9 | OK | ♀, 36 | ___do___ | Wet | 2 | 3 | 10 days | (++) |
| 10 | YA | ♂, 52 | ___do___ | Wet | 2 | At once | ___do___ | (++) |
| 11 | SA | ♂, 42 | ___do___ | Wet | 2 | ___do___ | ___do___ | (++) |
| 12 | NA | ♂, 49 | ___do___ | Wet | 2 | ___do___ | 15 days | (++) |
| 13 | SO | ♀, 38 | ___do___ | Wet | 2 | ___do___ | 7 days | (++) |
| 14 | KA | ♂, 58 | ___do___ | Wet | 2 | ___do___ | 10 days | (++) |
| 15 | IN | ♂, 68 | ___do___ | Wet | 2 | 2 | 7 days | (−) |
| 16 | FU | ♂, 62 | ___do___ | Wet | 2 | 3 | ___do___ | (++) |
| 17 | YA | ♂, 62 | ___do___ | Wet | 2 | 3 | 5 days | (++) |
| 18 | AO | ♀, 45 | ___do___ | Wet | 2 | 3 | 7 days | (++) |
| 19 | YA | ♂, 54 | ___do___ | Wet | 2 | At once | 9 days | (++) |
| 20 | SA | ♂, 32 | ___do___ | Wet | 2 | ___do___ | 7 days | (++) |
| 21 | TA | ♂, 65 | ___do___ | Wet | 2 | ___do___ | 9 days | (++) |
| 22 | KA | ♂, 54 | ___do___ | Wet | 2 | ___do___ | 1 time | (++) |
| 23 | HA | ♀, 38 | ___do___ | Wet | 2 | ___do___ | 5 times | (++) |

See footnote bottom of Table IV.

TABLE IV.—ANTITUSSIVE EFFECT ON OTHER RESPIRATORY DISEASES (WITH ORAL ADMINISTRATION OF CAPSULES)

| Case | Name | Sex, Age | Disease | Type of cough | Dose, mg. | Frequency of administering | Duration (Days or Times) | Antitussive effect |
|---|---|---|---|---|---|---|---|---|
| 1 | KI | ♂, 24 | Acute bronchitis | Dry | 2 | 3 | 5 days | (++) |
| 2 | TA | ♀, 42 | ___do___ | Dry | 2 | 3 | ___do___ | (++) |
| 3 | MI | ♂, 49 | ___do___ | Dry | 2 | At once | 3 days | (++) |
| 4 | FU | ♀, 17 | ___do___ | Dry | 1 | 3 | ___do___ | (−) |
| 5 | TA | ♀, 38 | ___do___ | Dry | 2 | 3 | 5 days | (++) |
| 6 | SA | ♀, 55 | ___do___ | Dry | 2 | 3 | 3 days | (++) |
| 7 | SA | ♂, 42 | ___do___ | Dry | 2 | 3 | ___do___ | (++) |
| 8 | AO | ♂, 62 | ___do___ | Wet | 2 | At once | 5 days | (+) |
| 9 | MI | ♂, 49 | ___do___ | Dry | 1 | ___do___ | 1 time | (−) |
| 10 | MI | ♀, 22 | ___do___ | Dry | 1 | ___do___ | 2 times | (+) |
| 11 | MI | ♂, 20 | ___do___ | Dry | 1 | ___do___ | 2 days | (+) |
| 12 | MI | ♀, 40 | ___do___ | Dry | 1 | ___do___ | 3 days | (+) |
| 13 | KI | ♂, 24 | ___do___ | Dry | 1 | 3 | ___do___ | (+) |
| 14 | KA | ♀, 32 | ___do___ | Dry | 1 | At once | 5 days | (+) |
| 15 | KA | ♂, 72 | Chronic bronchitis | Wet | 2 | ___do___ | 14 days | (++) |
| 16 | GO | ♂, 58 | ___do___ | Wet | 1 | 3 | 7 days | (++) |
| 17 | TA | ♀, 68 | ___do___ | Wet | 2 | At once | ___do___ | (++) |
| 18 | SA | ♀, 55 | ___do___ | Wet | 2 | 3 | 3 days | (++) |
| 19 | TA | ♀, 61 | ___do___ | Wet | 1 | At once | 5 days | (+) |
| 20 | NO | ♀, 36 | ___do___ | Dry | 1 | 3 | 7 days | (−) |
| 21 | OO | ♂, 38 | ___do___ | Wet | 1 | At once | 15 days | (+) |
| 22 | II | ♀, 67 | Cancer of the lung | Dry | 2 | 3 | 14 days | (++) |
| 23 | YA | ♂, 62 | ___do___ | Dry | 1 | At once | 25 days | (++) |
| 24 | HI | ♂, 56 | ___do___ | Wet | 2 | ___do___ | 5 days | (+) |
| 25 | KI | ♀, 56 | ___do___ | Wet | 2 | ___do___ | 3 days | (++) |
| 26 | YA | ♂, 62 | ___do___ | Wet | 1 | ___do___ | 10 days | (−) |
| 27 | RA | ♂, 65 | Spontaneous pneumothorax | Dry | 2 | ___do___ | 14 days | (++) |
| 28 | KI | ♂, 42 | ___do___ | Dry | 2 | 3 | 5 days | (++) |
| 29 | II | ♂, 56 | ___do___ | Dry | 2 | 2 | 10 days | (++) |
| 30 | ID | ♂, 18 | Pneumonia | Dry | 1 | 3 | 3 days | (++) |
| 31 | AK | ♂, 26 | ___do___ | Dry | 1 | 3 | 5 days | (++) |
| 32 | IN | ♀, 24 | ___do___ | Wet | 1 | At once | ___do___ | (++) |
| 33 | SA | ♀, 32 | ___do___ | Wet | 1 | ___do___ | 7 days | (++) |
| 34 | IC | ♀, 48 | Bronchial asthma | Dry | 2 | 3 | 10 days | (+) |
| 35 | KA | ♂, 53 | Wet pleurisy | Wet | 2 | 3 | 7 days | (++) |

NOTE.—In these Tables III and IV, the symbols (++), (+) and (−) in the "Antitussive effect" column mean clinically "excellent," "good" and "poor" antitussive effects, respectively.

It will be apparent from the above Tables I, II, III and IV that 14-hydroxy-dihydro-6β-thebainol 4-methyl ether exhibits excellent antitussive activity in clinical trails, particularly against dry cough resulting from various respiratory diseases, without exerting any pronounced and harmful side effect.

The folowing examples are given in order that this invention can be better understood, but they should be construed as being given only for purposes of illustration.

EXAMPLE 1

Solution for injection 14-hydroxy-dihydro-6β-thebainol 4-methyl ether—2 mg.
Sodium hydroxide—q.s. to pH 7.0
Distilled water for injection—q.s. 1 ml.

The active ingredient was dissolved in part of the water, the pH of the solution was adjusted to pH 7.0 with the sodium hydroxide and then the volume was brought up to 1 ml. The solution was filtered, filled in a conventional ampoule and autoclaved.

EXAMPLE 2

Soultion for injection 14-hydroxy-dihydro-6β-thebainol 4-methyl ether—2 mg.
Benzyl alcohol—10 mg.
Sodium chloride—5.8 mg.
Hydrochloric acid—q.s. to pH 7.0
Distilled water for injection—q.s. 1 ml.

The active ingredient, the alcohol and the chloride were dissolved in part of the water, the pH of the solution was adjusted to pH 7.0 with the hydrochloric acid, and then the volume was brought up to 1 ml. The solution was filtered, filled in a conventional ampoule, and autoclaved.

EXAMPLE 3

Solution for injection 14-hydroxy-dihydro-6β-thebainol 4-methyl ether—1 mg.
Benzyl alcohol—10 mg.
Sodium chloride—5.9 mg.
Distilled water for injection—q.s. 1 ml.

The active ingredient, the alcohol and the chloride were dissolved in part of the water and then the volume was brought up to 1 ml. The solution was filtered, filled in a conventional ampoule, and autoclaved.

EXAMPLE 4

Tablet

|  | Mg. |
|---|---|
| 14-hydroxy-dihydro-6β-thebainol 4-methyl ether | 1.14 |
| Lactose | 74.86 |
| Corn starch | 19 |
| Talc | 4 |
| Magnesium stearate | 1 |

The above ingredients were throughly mixed and compressed into a tablet (100 mg.)

EXAMPLE 5

Tablet

|  | Mg. |
|---|---|
| 14-hydroxy-dihydro-6β-thebainol 4-methyl ether | 2 |
| Lactose | 74.72 |
| Soluble starch | 18.5 |
| Talc | 4 |
| Magnesium stearate | 0.5 |

In the same manner as in Example 4, a tablet was made using the above ingredients.

EXAMPLE 6

Capsule

|  | Mg. |
|---|---|
| 14-hydroxy-dihydro-6β-thebainol 4-methyl ether | 1 |
| Lactose | 299 |

The above ingredients were thoroughly mixed and filled into a soft gelatin capsule.

EXAMPLE 7

Granules

|  | Mg. |
|---|---|
| 14-hydroxy-dihydro-6β-thebainol 4-methyl ether | 2 |
| Lactose | 76.72 |
| Starch | 20 |

The above ingredients were thoroughly mixed and granulated. The granules were then dried and screened.

What is claimed is:

1. A method for the relief of cough which comprises administering to a human subject suffering from cough at a daily dosage ranging from 3 to 12 mg. of 14-hydroxy-dihydro-6β-thebainol 4-methyl ether.

2. The method according to claim 1 wherein said administration is orally.

3. The method according to claim 1 wherein said administration is parenterally.

4. The method according to claim 1 wherein a daily dosage is 6 mg.

5. The method according to claim 1 wherein said thebainol is administered three times a day at a single dose of 1–4 mg.

6. The method according to claim 1 wherein said thebainol is administered in the form of a pharmaceutical composition.

7. The method according to claim 6 wherein said pharmaceutical composition is in the form of tablets, capsules, solutions for injection or granules.

8. The method according to claim 7 wherein each tablet contains about 0.5 to 4 mg. of said thebainol.

9. The method according to claim 7 wherein each capsule contains about 0.5 to 4 mg. of said thebainol.

References Cited

Chem. Abst. 59, p. 2589 h–2590 C (1963).

ALBERT T. MEYERS, Primary Examiner

S. J. FRIEDMAN, Assistant Examiner